United States Patent [19]

Shiho et al.

[11] Patent Number: 4,676,941

[45] Date of Patent: Jun. 30, 1987

[54] METHOD OF MANUFACTURE OF PLASTIC MOLDING

[75] Inventors: Masahiko Shiho, Suzaka; Yasunori Sato, Nagano, both of Japan

[73] Assignee: Fujitsu Limited, Kawasaki, Japan

[21] Appl. No.: 785,523

[22] Filed: Oct. 8, 1985

Related U.S. Application Data

[60] Continuation of Ser. No. 545,508, Dec. 12, 1983, abandoned, which is a division of Ser. No. 334,421, Dec. 24, 1981, Pat. No. 4,440,820.

[30] Foreign Application Priority Data

Dec. 24, 1980 [JP] Japan ................ 55-183491

[51] Int. Cl.$^4$ ............................................ B29C 39/12
[52] U.S. Cl. ..................... 264/247; 264/246; 264/328.7
[58] Field of Search ............ 264/246, 247, 328.9, 264/328.7; 425/110, 125

[56] References Cited

U.S. PATENT DOCUMENTS 2,510,091 6/1950 Dofsen et al. ................ 264/247
2,947,404 8/1960 Siebels et al. ................ 264/259

FOREIGN PATENT DOCUMENTS 0521056 5/1940 United Kingdom ........... 264/247

Primary Examiner—Jan H. Silbaugh
Assistant Examiner—Hubert C. Lorin
Attorney, Agent, or Firm—Daniel Jay Tick

[57] ABSTRACT

A plastic molding, such as a key top with signals or letters appearing on its face, has a first part molding having projections formed at its top defined an enclosed area. A second part molding of a color other than that of the first part molding is adhered to the surface of the first part molding in a manner permitting the ends of the projections to be exposed. The first part molding has a plurality of through holes formed in mesh configuration. At least one of the projections corresponds to at least one of the through holes. The second part molding is adhered to the first part molding to be buried in the plastic material of the second part molding. Part of the plastic material of the first part molding is filled into the enclosed area via the through holes. In a method of making such plastic molding, an inner member of the mold die may be used commonly regardless of the sign or letter provided in the plastic molding.

1 Claim, 16 Drawing Figures

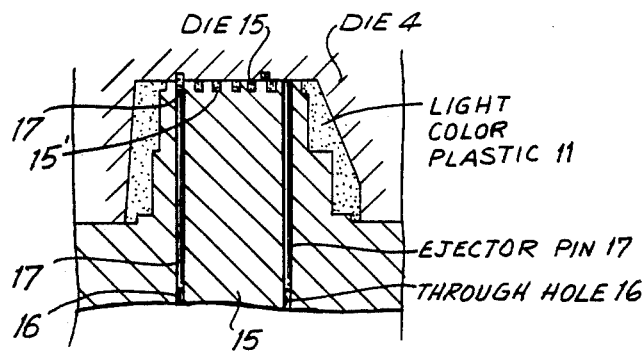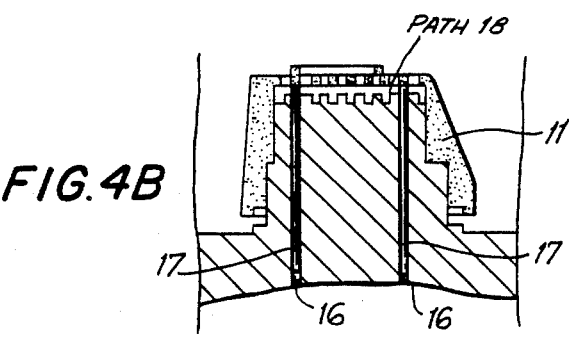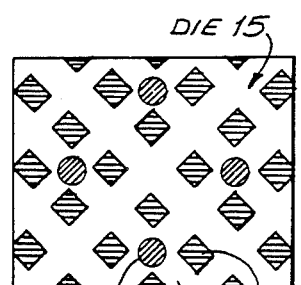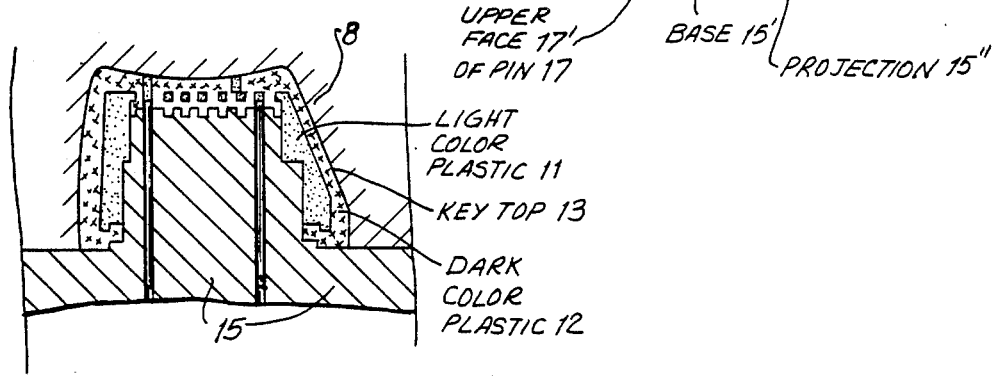

FIG.8A
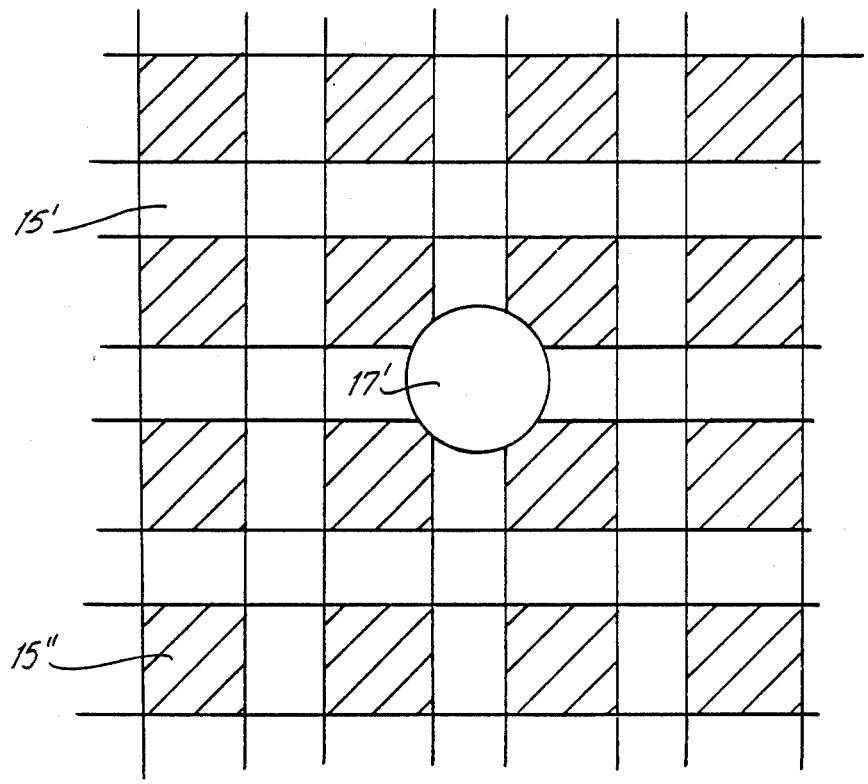
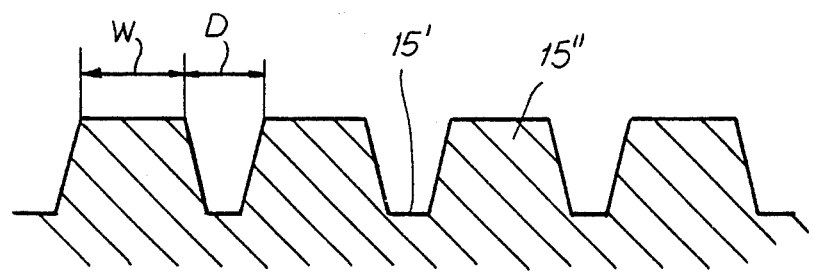
FIG.8B

METHOD OF MANUFACTURE OF PLASTIC MOLDING

BACKGROUND OF THE INVENTION

This is a continuation of application Ser. No. 545,508, filed Dec. 12, 1983, now abandoned, which, in turn, is a Division of application Ser. No. 334,421, filed Dec. 24, 1981, now issued as U.S. Pat. No. 4,440,820.

The present invention relates to plastic molding. More particularly, the invention relates to plastic molding in two different colors, and a method of manufacturing such plastic molding. The method utilizes a mold which facilitates formation of various symbols.

Plastic moldings made to have two colors are widely used to prepare, for example, key tops of an input means like a keyboard or a typewriter, the colored part forming letters and signs which function to permit visual selection or inspection of input and output information.

A key top of the prior art is made of plastic material, hereinafter called the first part molding, which indicates the sign O in a certain color such as, for example, gray, such as N8 of the Munsell color system. Plastic material, hereinafter called the second part molding, is placed against the first part molding and forms the part encircled by the sign O and the part outside such sign. The second part molding is a color other than gray such as, for example, dark gray, such as 5B3/0.5 of the Munsell color system.

Heretofore, the aforedescribed key top has been made generally by steps utilizing an outer die and an inner die for making the first part molding. The outer and inner dies are positioned facing each other at a predetermined place to form a cavity into which soft gray plastic material is injected to form the first part molding. The outer die of the first part molding is then removed, and a pin which movably extends through the inner die is slightly lowered to form a tunnel shape path beneath the part of the first part molding making the sign O. An outer die for the second part molding is then positioned at a predetermined place to face the inner die in a manner whereby it covers the first part molding. At such time, soft dark gray plastic material is injected into a cavity formed by the outer die to prepare the second part molding. The key top is thus completed.

Manufacture of the aforedescribed moldings is carried out by an injection molding machine having a first cylinder, a first cavity plate, a first strip plate, a first core, a slide core plate, a cam and an eject plate. The machine also has second identical parts. The core carrying part of the known apparatus rotates and moves vertically.

A pin is required for making moldings that have letters with enclosed areas such as, for example, capital letter signs A, B, D, and the like. The pin must be provided in the enclosed area. Then, soft plastic material for the second part molding is injected into the enclosed area. Because of this, there have been problems that, for each outer die of the first part molding used to make various patterns of signs having the enclosed area, an inner die corresponding to the outer die had to be prepared.

The principal object of the invention is to provide a plastic molding and method which overcome the problems experienced in the prior art.

An object of the invention is to provide a plastic molding and method which considerably reduce the cost of preparing dies.

Another object of the invention is to provide a plastic molding and method which dispense with the means for replacing the inner die.

Still another object of the invention is to provide a plastic molding and method which are of greater precision than heretofore.

Yet another object of the invention is to provide a plastic molding and method which increase the manufacturing yield of the color molding.

BRIEF SUMMARY OF THE INVENTION

In order to achieve these objects, and in accordance with the method of the invention for making a two color molding, an inner die is positioned to face an outer die for making first and second part moldings in order to form a desired cavity. A plurality of projections and eject pins are provided at the head of the inner die and face the patterns for the signs or letters of the outer mold for making the first part molding. After the first part molding is made, it has a plurality of through holes at its top and is raised a predetermined height from the inner die by means of the projections and the eject pins. The process for making the second part molding is then started.

One embodiment of the plastic molding of the invention comprises a first part molding formed at its top with projections defining an enclosed area and a second part molding of a color other than that of the first part molding. The second part molding is adhered to the surface of the first part molding including the enclosed area to permit exposure of the faces at ends of the projections. The first part molding has a plurality of scattered through holes formed therethrough and at least one of the projections corresponds to at least one of the through holes; all or some of the corresponding through holes being formed within the enclosed area. The second part molding is adhered to at least one part of the surface and back of the first part molding to permit the first part molding to be buried in its plastic material. The plastic materials on the surface and back are joined via the through holes, with part of the plastic material of the back being filled in the enclosed area via the through holes.

In another embodiment of the plastic molding of the invention, the first part molding is formed as a mesh with through holes and each of the through holes is positioned in a matrix configuration to maintain a predetermined distance between adjacent through holes.

In a further embodiment of the molding of the invention, the plastic molding is a key top which functions to operate a press button switch, and the like, and signs with enclosed areas, such as capital letters A, B, O, and the like, are formed by the projections.

One embodiment of the method of the invention for manufacturing plastic moldings comprises making, by a first molding process, a first part molding of plastic material having on its surface projections forming an enclosed area. A second part molding of a color other than that of the first part molding is then made by a second molding process such that the formed second part molding adheres to the surface of the first part molding. At least the enclosed area of the faces at the ends of the projections are exposed. The first part molding is made with a plurality of scattered through holes. At least one of the projections corresponds to at least one of the through holes; all or some of the corresponding through holes being positioned within the enclosed area. The second part molding is adhered to at least the surface and back of the first part molding to permit the first part molding to be buried in its plastic material. The plastic material of the surface and back are joined via the through holes, and part of the plastic material of the back is filled in the enclosed area via the through holes.

In another embodiment of the method of the invention, a mold die for molding the first and second part moldings is constituted by an outer die and an inner die which form, at least on the surface of the molding, a cavity for injection of plastic material thereinto. The inner die has, on its head facing the outer die, a plurality of projections to make through holes. The inner die faces the outer die in making the first part molding. A cavity is formed with the faces at the ends of the projections abutting the face of the outer die. During the making of the second part molding, the cavity is filled with plastic material and the first part molding is maintained at a center of a cavity provided by the inner die and the outer die for making the second part molding.

In a further embodiment of the method of the invention, the first part molding is supported in the cavity by an eject pin fitted in the inner die and protruding from the head of the inner die at the time of making the second part molding.

In still another embodiment of the method of the invention, projections protruding from the head of the inner die are formed at various positions in a matrix configuration with a predetermined pitch between projections, thereby permitting the first part molding to be formed as a mesh.

In yet another embodiment of the invention, the molding is a key top which functions to operate a press button switch, and the like. Signs, such as capital letters A, B, O, and so forth, each having an enclosed area or areas, are provided or formed on the surface of the key top by the projections.

BRIEF DESCRIPTION OF THE DRAWINGS

In order that the invention may be readily carried into effect, it will now be described with reference to the accompanying drawings, wherein:

FIGS. 4A, 4B and 4C are sectional views showing the steps of a first embodiment of the method of the invention for manufacturing the key top of the invention;

FIG. 5 is a plan view of an embodiment of the inner die of the invention;

FIG. 8A is a plan view, on an enlarged scale, of still another embodiment of the inner die of the invention; and FIG. 8B is a cross-sectional view, on an enlarged scale, of part of the die of FIG. 8A.

DETAILED DESCRIPTION OF PREFERRED EMBODIMENTS

Figure 1A:
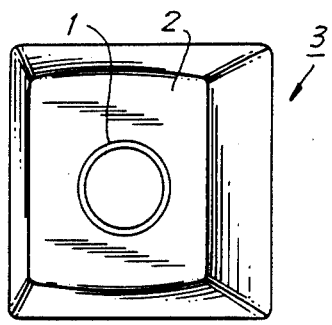
FIG. 1A is a plan view of a prior art key top with an O sign.
Figure 1B:
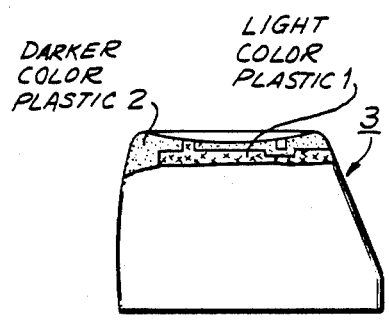
FIG. 1B is a side view of the key top of FIG. 1A, partially in section.

FIG. 1A is a plan view of a key top of the prior art having the sign O and FIG. 1B is a side view, partly in section, of the key top of FIG. 1A. The key top 3 of FIGS. 1A and 1B is made of plastic material 1, called the first part molding hereinafter, which indicates the sign O in a certain color such as, for example, gray, such as N8 of the Munsell color system. Plastic material 2, called the second part molding hereinafter, is placed against the first part molding 3 and forms the part encircled by the sign O and the part outside such sign. The second part molding is a color other than gray such as, for example, dark gray, such as 5B3/0.5 of the Munsell color system.

Figure 2A:
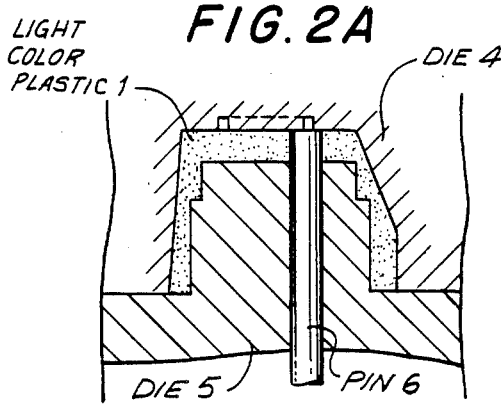
FIGS. 2A, 2B and 2C are sectional views illustrating the steps of the method of the prior art for making the key top of FIG. 1.
Figure 2B:
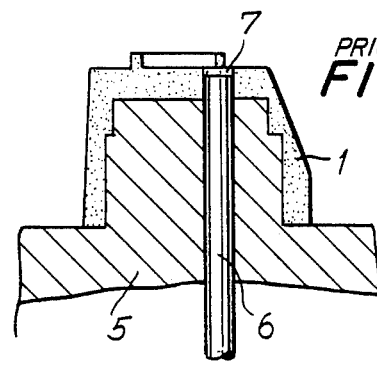
Figure 2C:
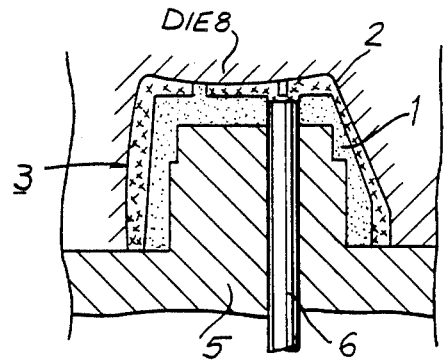

Heretofore, the key top 3 has been made generally by the steps illustrated in FIGS. 2A, 2B and 2C. Specifically, a die 4, which is referred to as an outer die, and an inner die 5 for making the first part molding are positioned facing each other at a predetermined place to form a cavity into which soft gray plastic material is injected to form the first part molding 1. Then, as shown in FIG. 2B, the outer die 4 of the first part molding is removed, and a pin 6, which movably extends through the inner die 5, is slightly lowered to form a tunnel shape path 7 beneath the part of the first part molding 1 making the sign O. An outer die 8 for the second part molding is then positioned at a predetermined place to face the inner die 5 in a manner whereby it covers the first part molding 1, as shown in FIG. 2C. At such time, soft dark gray plastic material is injected into a cavity formed by the outer die 8 to prepare the second part molding 2. The key top 3 is thus completed.

Figure 3:
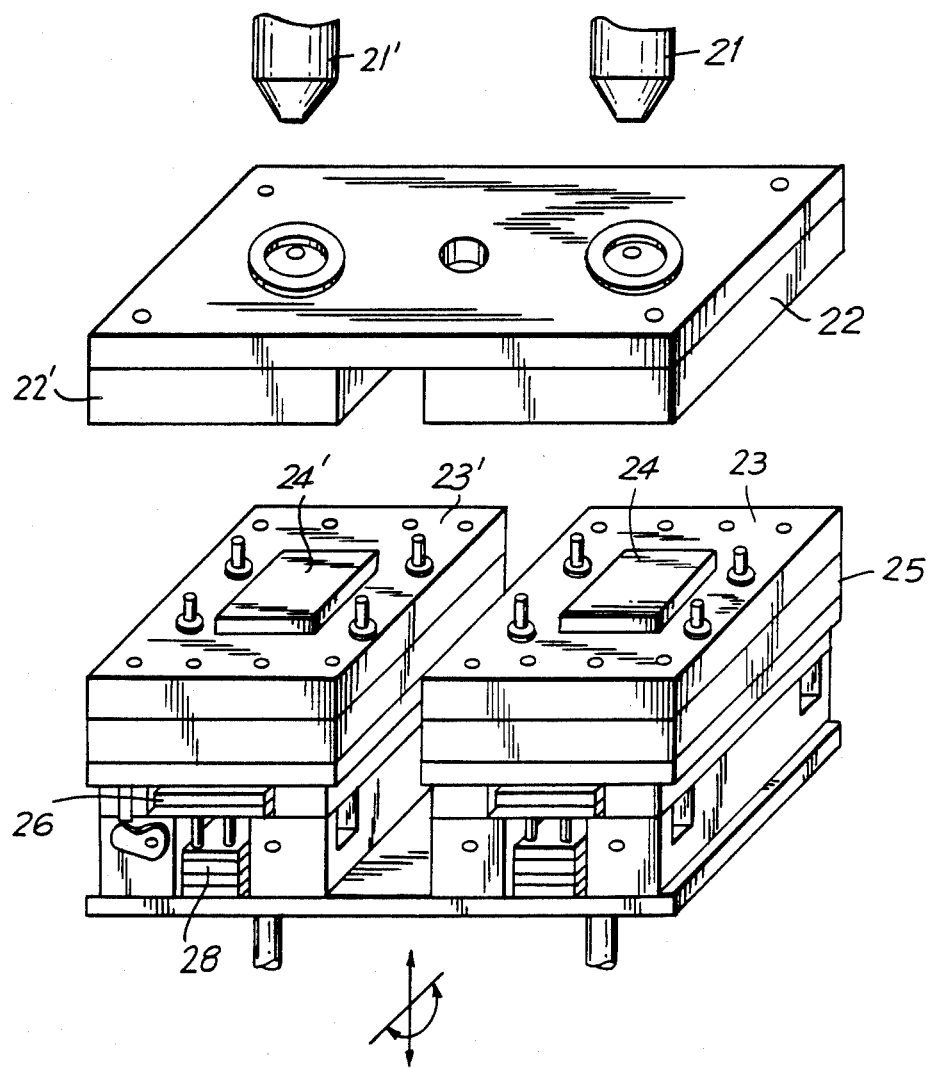
FIG. 3 is an isometric view of an injection molding machine of the prior art.

Manufacture of the aforedescribed moldings is carried out by an injection molding machine shown in FIG. 3 having a first cylinder 21, a first cavity plate 22, a first strip plate 23, a first core 24, a slide core plate 26, a cam 27 and an eject plate 28. The machine also has second parts 21' to 24' identical to the parts 21 to 24, respectively. The core carrying part of the known apparatus rotates and moves vertically. The structure and operation of the apparatus of FIG. 3 will be readily understood by a person skilled in the art, so that no further explanation is provided herein.

A pin 6 is required for making moldings that have letters with enclosed areas such as, for example, capital letter signs A, B, D, and the like. The pin 6 shown in FIGS. 2A, 2B and 2C must be provided in the enclosed area. Then, soft plastic material for the second part molding is injected into the enclosed area. Because of this, there have been problems that, for each outer die of the first part molding used to make various patterns of signs having the enclosed area, an inner die corresponding to the outer die had to be prepared.

FIGS. 4A to 4C illustrate the method of the invention for making a key top having a sign O and FIG. 5 is an enlarged plan view of an embodiment of the inner die. The outer die 4 is used for making the first and second part moldings.

Referring to FIG. 4A, a first part molding 11 is made by positioning the outer die 4 for making the first part molding and an inner die 15 at predetermined places so that they face each other. Then, soft plastic material of gray color is injected into a cavity formed by the dies 4 and 15. A cavity forming head of the inner die 15 which faces the O pattern engraved in the outer die 4 is, as depicted in FIG. 5, formed with grooves as a mesh, and a plurality of projections 15" protrude from a base 15' of the head. In addition, an eject, ejection or ejector pin 17, which is moved vertically by a cam (not shown in the FIGS.) fits in each of a plurality of through holes 16 which penetrate vertically through the inner die 15. An upper face 17' at the end of the eject pin 17 is substantially flush with the base 15' at the time the first part molding is made. The eject pin 17 may be circular or rectangular in cross-section. When soft plastic material is injected, it is so arranged that a lower face of the outer die 4 abuts an upper face of the inner die 15, and an upper face or ceiling of a cavity structure of said outer die abuts an upper face of the projection 15". The upper face of the first part molding 11 is therefore like a mesh and a number of through holes form the sign O protrudingly on such face. In operation, the through hole 16 also functions as an escape for gas generated in the molding.

Next, as shown in FIG. 4B, the outer die 4 for making the first part molding is removed while each eject pin 17 is raised a predetermined height. The mesh-like upper face of the raised first part molding is thereby moved away slightly from the upper face of the head of the inner die 15 to provide a path 18 for soft plastic material between said upper faces.

Furthermore, as illustrated in FIG. 4C, the outer die 8 for making the second part molding which covers the first part molding 11 is so positioned that its lower face and cavity forming face abut the upper face of the inner die 15 and the upper face of the sign O of the first part molding 11. Soft plastic material of dark gray color is injected in the cavity thus formed to make a second part molding 12. At such time, soft plastic material injected into the cavity through a gate (not shown in the FIGS.) provided in one part of the outer die 8 flows into an enclosed area of the sign O through the path 18, and a key top 13, similar to the key top depicted in FIG. 1, is produced.

Figure 6A:
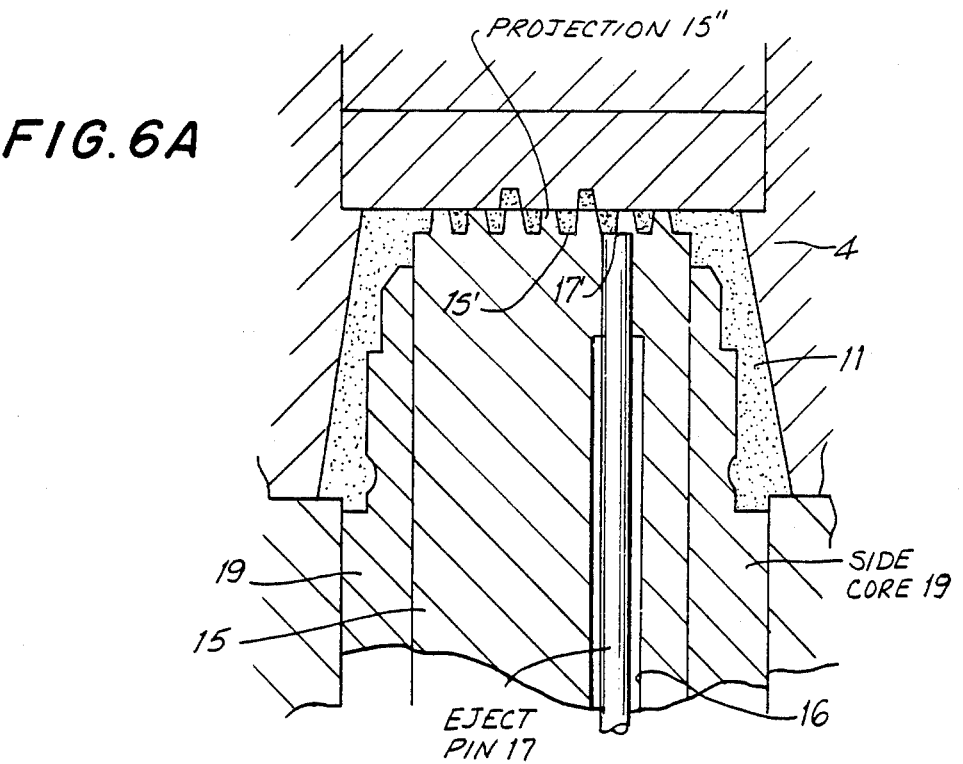
FIGS. 6A and 6B are sectional views, on an enlarged scale, similar to FIGS. 4A and 4C, of a second embodiment of the method of the invention.
Figure 6B:
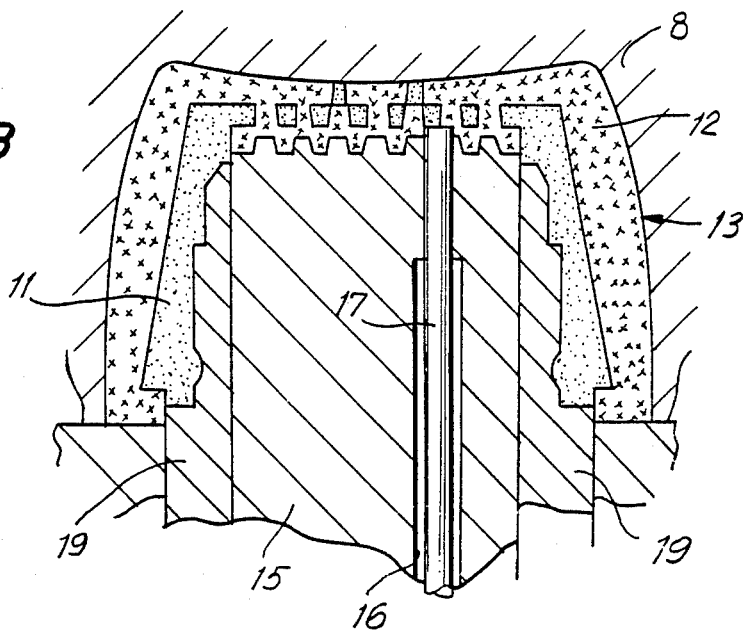

FIGS. 6A and 6B, which correspond to FIGS. 4A and 4C, illustrate other inner and outer dies to carry out the method of the invention. As will be understood from these FIGS., the projection 15" is so tapered that its head is smaller than its bottom or base part. Furthermore, the device shown is provided with side cores 19 which help the eject pin 17 in raising the first part molding 11.

Figure 7A:
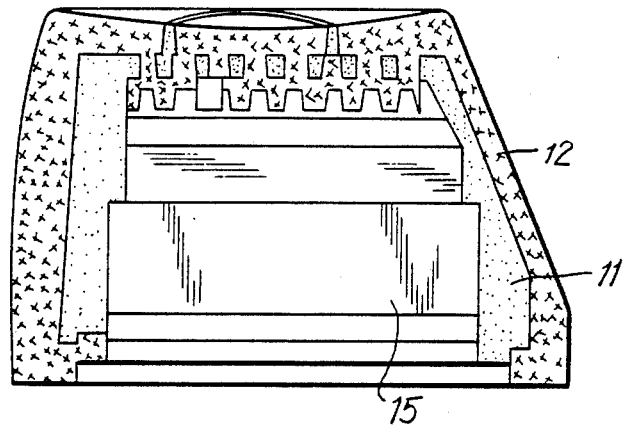
FIG. 7A is a sectional view, partly in section, similar to FIG. 6B of a third embodiment of the method of the invention.
Figure 7B:
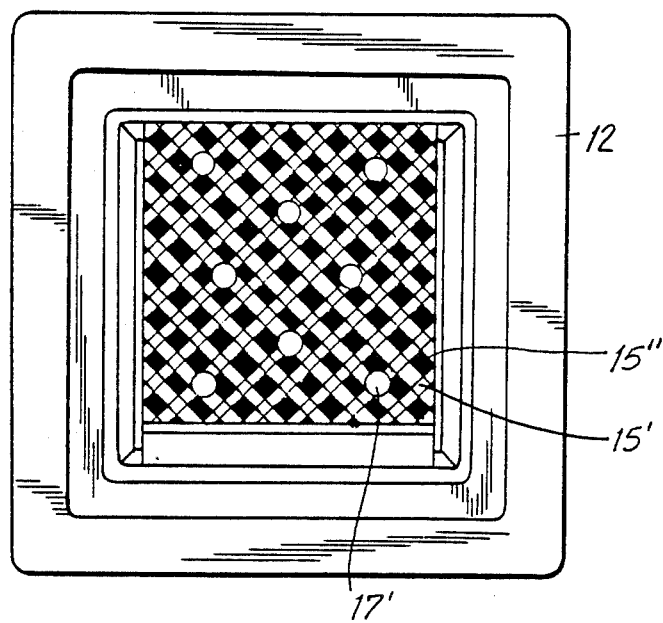
FIG. 7B is a plan view of another embodiment of the inner die of the invention.

Another embodiment of the molding of the invention is shown in FIGS. 7A and 7B, which correspond to FIGS. 6B and 5, respectively.

FIG. 8A, which corresponds to FIG. 5, shows a head of another inner die, and FIG. 8B is a sectional side view of the head of FIG. 8A. In this embodiment, the height of the projection 15" is set at 0.6 mm, the width W of its head is 0.45 mm and there is a distance D between the heads of 0.55 mm.

The inner die 15 is used commonly in making key tops of the same shape as the key top 13 with a letter having an enclosed area such as, for example, capital letters B, P, and so on, as well as other signs not having an enclosed area (these signs are not limited to such capital letters as C, P, and the like) unless such enclosed area is so small as to be hidden by the head (FIG. 5) of the inner die 15.

As will be understood from the foregoing description of the invention, the cost of preparing dies was substantially reduced by using the method of the invention, because the inner die is used commonly in the manufacture of two color moldings of the same shape, but having different signs. It makes no difference whether the signs have enclosed areas or not. The merit of the invention is not limited to the foregoing, because the means to replace inner dies which were required in the prior art are dispensed with. This enables the making of solid, strong dies which improves the degree of precision of the products in addition to increasing the manufacturing yield of two color moldings.

Although the invention has been described taking a key top as an example of the plastic molding, the invention is not limited thereto and is applicable to any other plastic moldings having patterns in two colors.

While the invention has been described by means of specific examples and in specific embodiments, we do not wish to be limited thereto, for obvious modifications will occur to those skilled in the art without departing from the spirit and scope of the invention.

We claim:

1. A method of manufacture of a plastic molding, said method including preparing a first part plastic molding and a second part plastic molding by utilizing an inner die and first and second outer dies, said inner die having a head part with an interior, said inner die being used in common to form the first and second part moldings and said first outer die being used to form said first part molding and having an enclosed area at the surface of said first outer die opposite said inner die, said first part molding having spaced top and bottom surfaces and having projections formed on its top surface for symbol indication in the enclosed area corresponding to a recession when said first part molding is formed, said first outer die and said inner die forming a first cavity therebetween during the forming of said first part molding and said cavity being filled with plastic material of a first color to form said first part molding, said enclosed area being part of said first cavity, forming said second part molding on the surface of said first part molding by depositing plastic material of a second color on said first part molding to form a key top of a pushbutton switch in a second cavity formed between said inner die and said second outer die and filling said second cavity with said plastic material of said second color, said method comprising the steps of providing on said head part of said inner die opposite said first outer die a plurality of spaced projections scattered at intersecting points of a matrix, said plurality of spaced projections having end surfaces in contact with the opposite surface of said first outer die and said enclosed area accommodating at least one projection;

providing the interior of said head part of said inner die with a plurality of eject pins protruding from the areas between said projections away from said outer dies;

filling said first cavity with said plastic material of said first color in a manner whereby a plurality of through holes are scattered at the intersecting points of the matrix in a mesh configuration;

separating said first outer die from said inner die and lifting said first part molding in said first cavity via said eject pins from said inner die to provide at least one of said plurality of through holes within the enclosed area formed by said at least one projection; and depositing said plastic material of said second color on at least the top and bottom surfaces of the first part molding, said plastic material of said second color being connected through said through holes and part of said plastic material of said second color being filled in said enclosed area formed by said at least one projection through said at least one of said plurality of through holes, while said first part molding is supported by said eject pins at the intermediate part of said second cavity formed by said inner die and said second outer die.

* * * * *